United States Patent
Ilnicki

(10) Patent No.: US 7,917,950 B2
(45) Date of Patent: Mar. 29, 2011

(54) PROTOCOL-GENERIC EAVESDROPPING NETWORK DEVICE

(75) Inventor: Slawomir K. Ilnicki, Los Altos Hills, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1717 days.

(21) Appl. No.: 11/127,486

(22) Filed: May 12, 2005

(65) Prior Publication Data

US 2006/0259966 A1    Nov. 16, 2006

(51) Int. Cl.
G08B 23/00    (2006.01)
(52) U.S. Cl. ............... 726/22; 726/23; 726/25; 709/224
(58) Field of Classification Search .................. 714/32, 714/43, 703, 41, 712, 4, 33, 46, 47, 44; 710/15; 370/242, 244, 245, 248, 348, 387, 395, 351, 370/352, 401, 402; 709/227, 217, 228, 221, 709/224; 703/13; 726/20, 22
See application file for complete search history.

(56) References Cited

U.S. PATENT DOCUMENTS

| | | | | |
|---|---|---|---|---|
| 5,613,069 | A * | 3/1997 | Walker ........................ | 709/238 |
| 6,442,141 | B1 * | 8/2002 | Borella et al. ................ | 370/248 |
| 6,560,720 | B1 * | 5/2003 | Chirashnya et al. ........... | 714/32 |
| 6,563,796 | B1 * | 5/2003 | Saito ............................ | 370/252 |
| 6,820,042 | B1 * | 11/2004 | Cohen et al. ..................... | 703/2 |
| 6,862,291 | B2 | 3/2005 | Talpade et al. | |
| 6,886,029 | B1 | 4/2005 | Pecus et al. | |
| 7,016,948 | B1 * | 3/2006 | Yildiz ............................ | 709/221 |
| 7,280,495 | B1 * | 10/2007 | Zweig et al. .................. | 370/312 |
| 7,681,032 | B2 * | 3/2010 | Peled et al. ................... | 713/154 |
| 2003/0037132 | A1 * | 2/2003 | Abdollahi et al. ............ | 709/223 |
| 2003/0046388 | A1 * | 3/2003 | Milliken ....................... | 709/224 |

FOREIGN PATENT DOCUMENTS

| WO | 01/47222 A2 | 6/2001 |
|---|---|---|
| WO | 2004/103006 A1 | 11/2004 |

OTHER PUBLICATIONS

DE Application 102006011449.3-31 filed Mar. 13, 2006 Office Action dated Mar. 31, 2008.

* cited by examiner

*Primary Examiner* — Pramila Parthasarathy
(74) *Attorney, Agent, or Firm* — Volentine & Whitt, PLLC

(57) ABSTRACT

According to one embodiment, a method comprises capturing, by an eavesdropping device, a packet communicated over a communication network. The eavesdropping device scans the packet's payload, and determines if an identifier is included in the packet's payload that identifies the packet as containing content of interest to the eavesdropping device. Based at least in part on determining that the packet's payload includes such identifier, the eavesdropping device uses the content of interest contained in the packet's payload. In one embodiment, a method comprises forming a packet containing content intended for an eavesdropping device, wherein the packet includes a header portion and a payload portion. The payload portion comprises a) a predefined identifier that identifies the packet as containing the content intended for the eavesdropping device, b) the content intended for the eavesdropping device, and c) an authentication token. The packet is directed via a communication network to a destination.

23 Claims, 2 Drawing Sheets

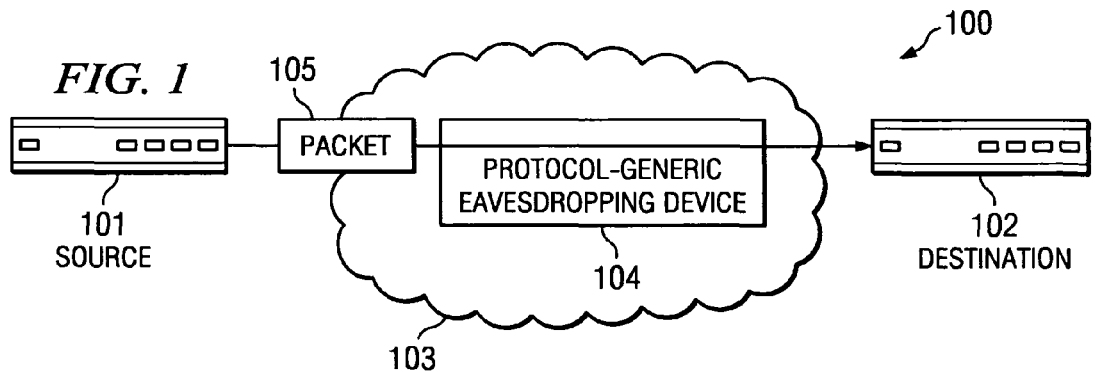
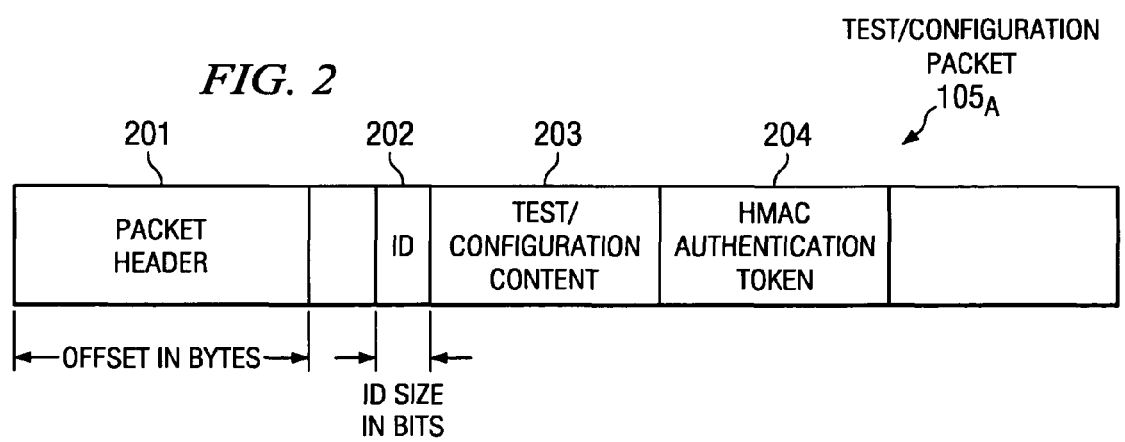

PROTOCOL-GENERIC EAVESDROPPING NETWORK DEVICE

BACKGROUND OF THE INVENTION

Communication networks are widely used today. Various types of communication networks exist, including without limitation the Internet and other wide-area networks (WANs), local-area networks (LANs), telephony networks, and wireless networks. Additionally, many different communication protocols exist today. Information is often communicated across communication networks from a source (or "sender") to one or more destinations. Additionally, monitoring devices may be implemented within the network for monitoring communication along such network. Such monitoring devices may be referred to as "eavesdropping devices" because they are generally not a party to the communication but are instead monitoring such communication for some reason, such as for performance monitoring of the network, testing, and/or other reasons. For instance, an eavesdropping device may capture packets sent along the network and analyze and/or insert a timestamp in the packets for use in monitoring the performance of the communication network.

Traditionally, when packets are sent to a specific network device, including eavesdropping devices, some form of network addressing is used. The device could be addressed explicitly, for example either by a data link layer address (e.g., Ethernet address) or by a network layer address (e.g., IP address). In this scheme, any networking device, including eavesdropping network devices, must be network addressable. If an active test is performed from a certain vantage point of the network (e.g., from a data source) and it is destined to a specific location (e.g., to a data destination) then the source has to use the data link or network layer address to reach the destination. If the destination is an eavesdropping device then the device has to have a network address in this traditional scheme. If the exact address of the eavesdropping device is not known a priori then the source could use either multicast or broadcast addresses, as examples. It should be noted that broadcast and multicast addresses may not be allowed or may not be practical to use in many cases.

It may be desirable in some instances for an eavesdropping device to receive communication that is destined from a source to a destination other than the eavesdropping device. That is, it may be desirable for the eavesdropping device to receive communication that is not addressed to such eavesdropping device, but is instead addressed to another destination. In this way, the eavesdropping device may monitor the packets that are communicated along a path from a source to a desired destination, rather than requiring that the packets be directed to the eavesdropping device. In some instances, it is desirable to not have a unique network address assigned to an eavesdropping device. For example, to minimize the total number of IP addresses required for devices on the network, certain devices may not be assigned a unique IP address. For instance, a router that has multiple ports may be assigned a single IP address, rather than a separate IP address being assigned for each of its ports.

It thus becomes desirable to enable a way for the eavesdropping device to identify packets that are of interest to it. For instance, certain packets may include information that the eavesdropping device desires for analyzing, for testing, for altering its configuration, etc. Thus, information that is intended for use by the eavesdropping device may be included in certain packets communicated across the network.

Traditionally, eavesdropping devices evaluate information included in the header of packets to identify those packets that are of interest to the eavesdropping device, e.g., the packets that include test information, configuration information, and/or other information intended for the eavesdropping device. For instance, a packet filter may match IP destination address with device IP address. As another example, for an Ethernet device, a frame filter may check if destination MAC address in a captured frame matches the device MAC address. Those addresses are in very specific places of corresponding headers, as is well-known in the art. In Ethernet, for example, the destination MAC address is the first 6 bytes of the frame. This requires the eavesdropping device to be implemented with knowledge regarding the protocol that is used by the packets it captures. That is, the eavesdropping device must have the capability of understanding the communication protocols that it encounters so that it can successfully evaluate the header information included in the packets according to the various protocols. Many protocols exist, and protocols continue to change and be developed, which is burdensome for implementing/updating eavesdropping devices that are capable of evaluating packets communicated via any of the various protocols to identify those packets that are of interest.

Accordingly, traditional eavesdropping devices must be implemented to have knowledge regarding the protocols that they may encounter. This increases the complexity of the devices, which may undesirably increase their size and increase their processing time. Further, such complexity increases the time and resources required for manufacturing the eavesdropping devices.

BRIEF SUMMARY OF THE INVENTION

Embodiments of the present invention provide a protocol-generic (or "protocol-unaware") eavesdropping device that is capable of monitoring traffic communicated over a communication network and identify packets within such traffic that are of interest to the eavesdropping device. As described further herein, techniques are provided that enable packet identification and packet authentication. As described further herein, in certain embodiments such "packet authentication" does not authenticate the entire packet, but instead authenticates the ID and content that is intended for the eavesdropping device. Thus, an eavesdropping device can identify packets that are of interest and can authenticate the identifying information and the information that is of interest to the eavesdropping device. Embodiments of the present invention are protocol-generic and thus do not require that the eavesdropping device have a priori knowledge about the communication protocol being used in order for the eavesdropping device to be able to identify packets that are of interest and authenticate such packets. Thus, the protocol-generic eavesdropping device can be employed and dynamically adapt to any communication protocol that may be utilized on the communication network without requiring any modification to the eavesdropping device.

As described further below, rather than including information in a packet in a protocol-specific way (such as in the header of packets) for identifying the packet as one that is of interest to the eavesdropping device, embodiments of the present invention include an identifier in a protocol-generic manner. For instance, an identifier may be included in the payload of the packet. In certain embodiments, the eavesdropping device can scan the payload of a captured packet for an identifier, and upon recognizing the identifier may use techniques for authenticating the packet.

According to one embodiment, a method comprises capturing, by an eavesdropping device, a packet communicated over a communication network. The eavesdropping device scans the packet's payload, and determines if an identifier is included in the packet's payload that identifies the packet as containing content of interest to the eavesdropping device. Based at least in part on determining that the packet's payload includes such identifier, the eavesdropping device uses the content of interest contained in the packet's payload.

According to one embodiment, a method comprises forming a packet containing content intended for an eavesdropping device, wherein the packet includes a header portion and a payload portion. The payload portion comprises a) a predefined identifier that identifies the packet as containing the content intended for the eavesdropping device, b) the content intended for the eavesdropping device, and c) an authentication token for authenticating the predefined identifier and the content intended for the eavesdropping device. The method further comprises directing the packet via a communication network to a destination. In certain embodiments, the destination to which the packet is directed is a destination other than the eavesdropping device, wherein the eavesdropping device intercepts such packet and recognizes it as containing the content intended for the eavesdropping device.

The foregoing has outlined rather broadly the features of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 shows an exemplary system employing one embodiment of the present invention;

FIG. 2 shows an exemplary configuration of a communication packet according to one embodiment of the present invention.

DETAILED DESCRIPTION OF THE INVENTION

Figure 3:
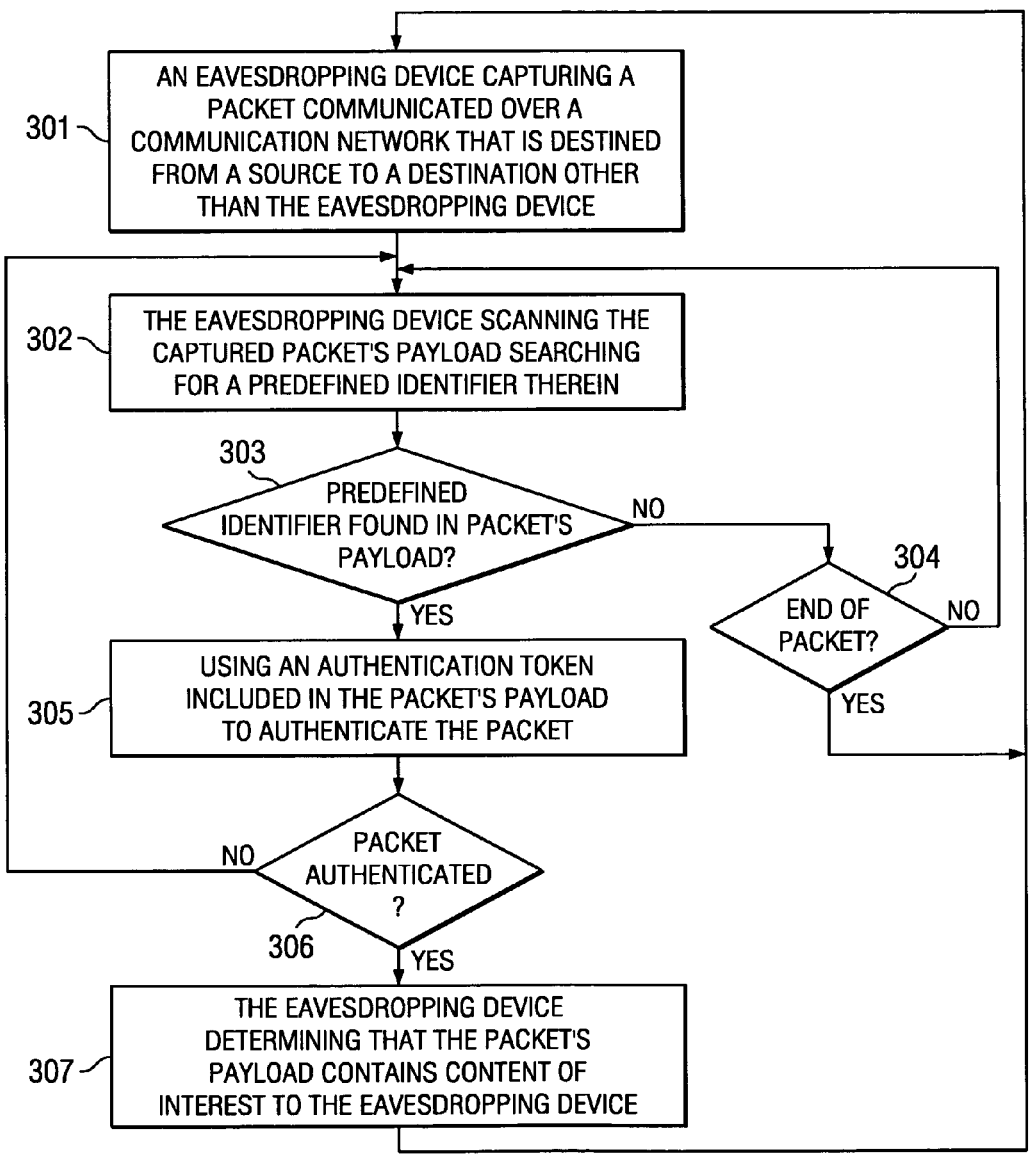
FIG. 3 shows an operational flow diagram according to one embodiment of the present invention.

Embodiments of the present invention provide a protocol-generic (or "protocol-unaware") eavesdropping device that is capable of monitoring traffic communicated over a communication network and identify packets within such traffic that are of interest to the eavesdropping device. As described further herein, techniques are provided that enable packet identification and packet authentication. That is, an eavesdropping device can identify packets that are of interest and can authenticate such packets. Embodiments of the present invention are protocol-generic and thus do not require that the eavesdropping device have a priori knowledge about the communication protocol being used in order for the eavesdropping device to be able to identify packets that are of interest and authenticate such packets. Thus, the protocol-generic eavesdropping device can be employed and dynamically adapt to any communication protocol that may be utilized on the communication network without requiring any modification to the eavesdropping device.

As described further below, rather than including information in a packet in a protocol-specific way (such as in the header of packets) for identifying the packet as one that is of interest to the eavesdropping device, embodiments of the present invention include an identifier in a protocol-generic manner. For instance, an identifier may be included in the payload of the packet. In certain embodiments, the eavesdropping device can scan the payload of a captured packet for an identifier, and upon recognizing the identifier may use techniques for authenticating the packet.

In certain embodiments, information that is intended for an eavesdropping device may be thought of as a packet within the packet. That is, a portion of the packet's payload intended for the eavesdropping device may be thought of as a packet, wherein the overall packet may be referred to as a "carrying packet" (or "purse packet") and the portion of the overall packet that is intended for the eavesdropping device may be referred to as an "embedded packet" (or "wallet packet"). Just as a purse may carry a wallet (that itself carries certain items), a purse packet may carry a wallet packet that includes information intended for the eavesdropping device. The wallet portion of the carrying packet (i.e., the portion intended for the eavesdropping device) may be identified by an identifier included in the payload of such carrying packet. The wallet portion of the carrying packet may include information intended for the eavesdropping device, such as test or configuration information. Accordingly, the wallet portion of the carrying packet includes an identifier (ID) and content that is intended for the eavesdropping device. Further, an authentication technique may be employed for authenticating the wallet portion of the carrying packet. Thus, the carrying packet may further include an authentication token that can be used for authenticating the wallet portion of the carrying packet. As described further herein, such authentication promotes safe operation and eliminates false-positives that may otherwise be encountered.

FIG. 1 shows an exemplary system 100 employing one embodiment of the present invention. System 100 includes a data source device 101 and a destination device 102 that are communicatively coupled via communication network 103. Communication network 103 may be any type of communication network now known or later developed, including without limitation the Internet and/or other WAN, LAN, telephony network, wireless network, and/or any combination of the foregoing. Preferably, communication network 103 is a packet-switched network. While only two devices 101 and 102 are shown as communicatively coupled via communication network 103 in this example, it should be understood that any number of devices may be so connected. In practice, typically many devices are communicatively coupled via a communication network such that they can communicate with one another in the manner described in this illustrative example for devices 101 and 102. Further, while device 101 is indicated as a source and device 102 is indicated as a destination in this example, it will be appreciated that communication may be bi-directional such that in some instances device 102 is the source and device 101 is the destination. Protocol-generic eavesdropping device 104 is employed in communication network 103 for monitoring packets communicated across such network, such as packet 105 being communicated in this illustrative example from source 101 to destination 102.

Protocol-generic eavesdropping device 104 is capable of capturing (e.g., intercepting) packets traveling from source 101 to destination 102, and determine whether a captured packet includes information of interest to the eavesdropping device, such as test or configuration information. In the example of FIG. 1, let us assume that packet 105 is a test/configuration packet traveling from source 101 to destination 102. On the way to destination 102, packet 105 is intercepted by protocol-generic eavesdropping device (or "probe") 104. Protocol-generic eavesdropping device 104 recognizes packet 105 as a special test/configuration packet by scanning for and finding an ID embedded in the packet's payload. Such ID may be injected into the packet's payload by the source of the packet. For example, source 101, which could also be an eavesdropping device, may clone a passing-by packet and change its content (payload) by inserting the ID and other information intended for eavesdropping device 104.

An exemplary configuration of packet 105 according to one embodiment is shown in FIG. 2 as packet $105_A$. Packet $105_A$ includes a packet header 201 as is typically included in packets. Packet $105_A$ further includes an ID 202 followed by content 203 that is intended for eavesdropping device 104. As mentioned above, packet $105_A$ may be referred to as a carrying or purse packet, and portions 202 and 203 of packet $105_A$ may be referred to as an embedded or wallet packet. Packet $105_A$ also includes an authentication token 204 for authenticating portions 202 and 203. In this example, authentication token 204 is an HMAC (hash-based message authentication code) authentication token, which is generated using a well-known authentication technique as described further below. Of course, any other authentication technique now known or later developed may be employed in other embodiments.

It should be recognized that embodiments of the present invention do not negate existing methods, but rather extend them by specifying that a special packet intended for an eavesdropping device can be identified by some form of identity embedded into the packet's payload. For instance, in order for a test/configuration packet $105_A$ to be recognized as a special packet by protocol-generic eavesdropping device 104, such eavesdropping device is to know ID(s) 202 that can be inserted by the source 101 for identifying packets as special (e.g., known Ids may be stored locally to the eavesdropping device for use in comparison with potential IDs included in received packets). Any suitable type of identifying information may be used as ID(s) 202. For example, the ID 202 could be a unique MAC address of a specific probe or a multicast MAC address that addresses a community of probes. Source 101 and the probe(s) are implemented in this embodiment to know where to insert ID 202 in the packet and to know how to find it. The ID may be a string of bytes or any pattern (which may be referred to as a "fingerprint") that is inserted into the packet's payload and demarcated with well known strings. For example, the ID may include a string that starts with "GBIC" and ends with "CIBG." Similarly, in certain embodiments, the ID may include a portion of such ID before the content 203 and a portion at the end of the content 203, similar to tags that are used in XML/HTML. For instance, "GBIC" may be an ID indicating the start of the content 203, and "CIBG" may indicate the end of the content 203, wherein only if both the starting and ending IDs are found is the packet considered as a "special" packet that is of interest. As another example, ID 202 may be a pattern that is arranged at or beyond a well-known offset from the beginning of the frame/packet or specific packet header. It should be noted that in such an implementation ID 202 does not have to be inserted exactly at the offset, but rather at a location beyond the offset such that protocol-generic eavesdropping device 104 may be implemented to begin its search through the packet after such offset looking for ID 202. In other words, protocol-generic eavesdropping device 104 may perform pattern matching starting from the offset point in the packet to determine if the ID 202 is found. In certain embodiments, the size of ID 202 could be fixed for a specific ID or for all possible type of IDs. Of course, in certain embodiments, such as those employing ID demarcation, then an offset location and ID size does not have to be pre-defined for a packet to be identified as special.

In operation of one embodiment, the intercepting protocol-generic eavesdropping device 104 scans the captured packet's $105_A$ payload looking for ID 202 and it will stop at the first match. Therefore, in certain embodiments, when inserting ID 202 into packet $105_A$, source 101 makes sure that the space between the ID 202 and the beginning of the packet scanning area does not include any information that could be falsely identified as a special ID. In one embodiment, the source 101 may fill any space that could be falsely identified as an ID with null bytes. However, modifying such portion of the packet in this manner may not always possible or desirable, and whether such technique is proper to employ may also depend on the authentication technique employed. In certain embodiments, instead of or in addition to use of such offset null bytes, an authentication technique may be employed to notify the eavesdropping device if it attempts to consider the wrong ID. That is, if a false-positive ID exists in the packet before the true ID, then the content following the false-positive ID would not be authenticated by the token 204. Therefore, the eavesdropping device could detect that the false-positive ID is not true, and continue scanning the packet for any other IDs until it reaches the true ID which is authenticated or the end of the packet.

It should be noted that for test/configuration packets $105_A$, the packet header 201 might contain the IP address of a router or network device to which the packet will travel. When protocol-generic eavesdropping device 104 intercepts the packet, such eavesdropping device 104 scans the payload looking for ID 202. By matching the ID inside the packet $105_A$ with ID(s) known to the eavesdropping device 104, the eavesdropping device 104 could recognize it as a special test/configuration packet and could act on the test/configuration content that follows the ID 202. Again, the ID field 202 could be implemented as any type of identifier. As one example, the ID 202 could be a combination of MAC address and VLAN ID. If the MAC address is, for example, a broadcast and VLAN ID matches the eavesdropping device's VLAN ID it could be recognized as a special test/configuration packet that can be processed by eavesdropping devices that belong to the same VLAN.

Inside the packet payload following ID 202 is information 203 intended for the eavesdropping device (or of interest to the eavesdropping device), such as test/configuration content having a format that is known to the eavesdropping device. For example, such content 203 could be the size of the test/configuration content followed by an operation code, sequence number, timestamp and some other attributes for active test packet measuring delay. Authentication token (e.g., HMAC Authentication Token) 204 that follows the content 203 is used, at least in part, for eliminating false-positives, as described further below.

During packet payload scan it may happen that by coincidence, the content of a regular packet matches one of the IDs known to the protocol-generic eavesdropping device 104. This may lead the eavesdropping device 104 to believe that data following the matched value represents information of interest to it (e.g., test or configuration data). To prevent such false positive, the packet payload may further include an authentication token 204. In one embodiment, HMAC authentication of the packet is used, which is a well-known authentication technique. In one embodiment, this authentication is just for the "wallet" portion of the packet 105A. That is, it authenticates the ID 202 and content 203 portion of packet 105A. This authentication may be based on a shared secret that is hashed with the packet payload. In one embodiment, the HMAC authentication not only positively identifies packets as test/configuration packets, but also identifies that they are coming from a legitimate source 101. It should be noted that in one embodiment the shared secret is shared between the source of test/configuration packets 105A (source 101 of FIG. 1) and the protocol-generic eavesdropping devices 104. To identify the packet as special, the HMAC authentication hash may include packet header information that does not change during routing and will not include packet payload that follows the HMAC authentication token. This means, for example, that IP header TTL (Time-To-Live) is not included in the hash in this example because it changes from hop to hop. To make implementation simple, i.e., without paying attention of all the fields, the source 101 may just copy the packet header to the payload. The eavesdropping device 104 could then verify not only the HMAC authentication but also if the packet header in the payload matches parts of the real packet header. This form of protection is against attack of impersonation where the attacker could cut and paste the content using his/her own packets.

It should be understood that content of the data packets could be authenticated in many ways. HMAC is one exemplary technique, which is basically a hash of the data payload with some shared secret. Again, embodiments of the present invention are not limited to such HMAC authentication technique.

FIG. 3 shows an operational flow diagram according to one embodiment of the present invention. In operational block 301, an eavesdropping device 104 captures a packet 105 communicated over a communication network 103 that is destined from a source 101 to a destination 102 other than the eavesdropping device. In operational block 302, the eavesdropping device 104 scans the captured packet's payload searching for a predefined identifier 202 therein. In operational block 303, the eavesdropping device 104 determines whether the predefined identifier 202 is found in the packet's payload. If such predefined identifier 202 is not found, operation advances to block 304 to determine whether the end of the packet is reached. If the end of the packet is not reached, operation returns to block 302 where the device continues scanning the packet. If the end of the packet is reached, the packet is considered as not included information of interest to the eavesdropping device, and operation returns to block 302 to capture the next packet.

According to one embodiment, the device starts reading the content 203 following a found hashing id 202 until it reaches the authentication token 204. If the eavesdropping device does not know a priori where the authentication token 204 is with each hashed byte, it checks if the following bytes represent the authentication token. This is a very consuming process in this case because any time the new byte is read the device has to hash the product with the shared secret and compare it with the following bytes. In typical application of this embodiment of the invention, the ID 202 may indicate the size of the content 203 and where to find the authentication token 204. Thus, the ID 202 may not only include information that identifies it as containing content of interest to the eavesdropping device, but it may also include certain variable fields of information that the eavesdropping device can understand as specifying the length of the content 203 and where to find the authentication token 204. If the predefined identifier 202 is found in the packet's payload, operation advances from block 303 to block 305 where the eavesdropping device uses an authentication token 204 included in the packet's payload to authenticate the packet. In operational block 306 the eavesdropping device determines whether the ID and content of the packet is successfully authenticated. If not, operation returns to block 302 and continues scans to below where the previous ID was find in the packet to determine whether another (true) ID is included therein. In FPGA or ASIC implementation, it may do parallel hashes any time an ID is found.

If the ID and packet content is successfully authenticated, operation advances from block 306 to block 307 where the eavesdropping device determines that the packet's payload contains content 203 of interest to the eavesdropping device. In response thereto, the eavesdropping device may be triggered to take further action, such as acting on the content of interest or otherwise using the content of interest in some way. For example, the content may be used as configuration information, and/or the device may extract a timestamp that was inserted by a node earlier to determine one-way delay. For instance, a sending probe may insert a sequence number and a timestamp inside the packet payload, as well as an operation code that will inform the sink probe to get the first 128 bytes of the packet and send that information with a timestamp when the packet arrives at the sink probe to a data collector. The 128 bytes of the packet could be parsed by the collector to determine what this packet is about and from sequence number and timestamps it could determine packet delay, packet delay variation and packet loss if there are more packets of the same kind captured and analyzed at the data collector. The probes could be totally agnostic about what the packets are about. Operation then returns to block 301 where the eavesdropping devices captures another packet and the above-described process may be repeated.

In view of the above, certain embodiments of the present invention do not require the usage of data link or network layer addresses in packet header to identify packets that are subject for processing as test or configuration packet by an eavesdropping device. Rather, a protocol-generic technique is provided which may be employed by eavesdropping devices for identifying packets that are of interest, such as test/configuration packets. One application of embodiments of the present invention is for configuration of network devices that are not network addressable via IP address from the source. For example, the device does not have IP address yet configured or there may not be enough IP addresses available on the subnet on which the device is located. The term "eavesdropping device" is used herein to encompass any such network device that is not network addressable, as well as any network device that is network addressable but which intercepts packets that are destined for another destination. That is, device 104 in FIG. 1 may be either of these types of devices. For instance, it is common practice that on a subnet that link only two routers the subnet only allows for two IP addresses. In this case, it will not be possible to add a third device that is network addressable. Changing the subnet structure of the existing networks could be an enormous task and may not be feasible/desirable because IP address space is a precious commodity.

Active performance tests are performed today which may be used, for example, to determine connectivity, packet delays variation, and packet loss, may use packets that have special packet headers. Those packets may not represent the real packets that travel through the network and therefore they may be treated differently by the networking infrastructure. For example, the ping utility uses very specific UDP packets; the same can be said about the traceroute utility. However, embodiments of the present invention allow use of any packet headers, including those that represent real traffic. This means that active test packets will follow the same path and be the subject to the same routing rules as real, normal traffic. In other words, embodiments of the present invention allow identification of those packets as special test and configuration packets, regardless of the packet headers contents. Further, the source 101 need not know a priori the path to send a special packet in order for it to be intercepted by a specific eavesdropping device, according to certain embodiments of the present invention. This is beneficial because in some instances the source 101 does not know the path, as mentioned earlier, due to lack of available IP addresses. Accordingly, embodiments of the present invention allow test packets to travel to destination and those packets could be intercepted by various network devices (referred to herein as "eavesdropping devices") on its path and be identified by the intercepting devices as a test packet.

Certain embodiments of the present invention advantageously provide a flexible way of addressing network devices over what has been done traditionally. Special test or configuration packets do not have to use the data link or network layer addresses explicitly in the packet headers. Embodiments of the present invention allow test packets to look, from the packet header point of view, like any other real, normal packet, which means that such packets can follow the real, normal traffic path and be subject to the same routing rules as the real traffic. As described above, techniques enable a protocol-generic way of identifying packets as being of interest to an eavesdropping device.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
    capturing, by an eavesdropping device, a packet communicated over a communication network;
    scanning, by said eavesdropping device, said packet's payload; and
    determining, by said eavesdropping device, if an identifier is included in the packet's payload that identifies the packet as containing content of interest to said eavesdropping device;
    authenticating, by said eavesdropping device, said packet's payload using an authentication token included in said packet's payload; and
    based at least in part on determining that said packet's payload includes said identifier, said eavesdropping device using said content of interest contained in said packet's payload.

2. The method of claim 1 wherein said packet is destined from a source to a destination other than said eavesdropping device.

3. The method of claim 1 wherein said eavesdropping device uses said content of interest if it is determined that said packet's payload includes said identifier and said packet's payload is authenticated.

4. The method of claim 1 wherein said authentication token authenticates said identifier and said content of interest in said packet.

5. The method of claim 1 wherein said content of interest comprises data intended, by a source of said data, for said eavesdropping device.

6. The method of claim 5 wherein said data comprises test data.

7. The method of claim 6 wherein said test data comprises data for measuring delay of communicating said packet from said source to said eavesdropping device.

8. The method of claim 5 wherein said data comprises configuration data for configuring said eavesdropping device.

9. A method comprising:
    capturing, by an eavesdropping device, packets communicated over a communication network that are destined from a source to a destination other than said eavesdropping device;
    scanning, by said eavesdropping device, payloads of said captured packets searching for a predefined identifier therein; and
    when said identifier is found in a captured packet, said eavesdropping device authenticating said captured packet using an authentication token included in the packet's payload, and, if authenticated, said eavesdropping device determining that the corresponding packet's payload contains content of interest to said eavesdropping device.

10. The method of claim 9 further comprising:
    said eavesdropping device using said content of interest contained in said packet's payload in which said identifier was found and which was authenticated.

11. The method of claim 10 wherein said using comprises:
    using said content of interest for configuring said eavesdropping device.

12. The method of claim 10 wherein said using comprises:
    using said content of interest for testing.

13. The method of claim 9 wherein said authenticating comprises:
    using said authentication token to authenticate said predefined identifier and content of interest included in said packet.

14. The method of claim 9 wherein said packet comprises a wallet portion comprising said predefined identifier and said content of interest, and wherein said authentication token authenticates said wallet portion.

15. The method of claim 9 wherein said content of interest comprises data intended, by said source, for said eavesdropping device.

16. A method comprising:
forming a packet containing content intended for an eavesdropping device, wherein said packet includes a header portion and a payload portion, said payload portion comprising
 a) a predefined identifier that identifies said packet as containing said content intended for said eavesdropping device,
 b) said content intended for said eavesdropping device, and
 c) an authentication token for authenticating said predefined identifier and said content intended for said eavesdropping device; and
directing said packet via a communication network to a destination.

17. The method of claim 16 wherein said destination comprises a destination other than said eavesdropping device.

18. The method of claim 17 further comprising: said eavesdropping device intercepting said packet.

19. The method of claim 18, further comprising said eavesdropping device using said content of interest contained in said packet's payload in which said identifier was found and which was authenticated.

20. The method of claim 16 wherein said content intended for said eavesdropping device comprises test data.

21. The method of claim 20 wherein said test data comprises data for measuring delay of communicating said packet from said source to said eavesdropping device.

22. The method of claim 16 wherein said content intended for said eavesdropping device comprises configuration data for configuring said eavesdropping device.

23. A tangible computer-readable medium having stored thereon a communication packet, said communication packet comprising:
a header portion; and
a payload portion that comprises:
 a predefined identifier that identifies said payload portion as containing content of interest to an eavesdropping device,
 said content that is of interest to said eavesdropping device, and
 an authentication token for authenticating said predefined identifier and said content of interest.

* * * * *